US007344575B2

(12) United States Patent
Thurber et al.

(10) Patent No.: US 7,344,575 B2
(45) Date of Patent: Mar. 18, 2008

(54) COMPOSITION, TREATED BACKING, AND ABRASIVE ARTICLES CONTAINING THE SAME (75) Inventors: Ernest L. Thurber, Somerset, WI (US); Marcos R. Nery, Sao Paulo (BR); Jeffrey S. Peterson, Hudson, WI (US); Don H. Kincaid, Hudson, WI (US); Gregory A. Berg, Lindstrom, MN (US); James L. McArdle, Stillwater, MN (US); Steven J. Keipert, Somerset, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 431 days.

(21) Appl. No.: 11/167,887

(22) Filed: Jun. 27, 2005

(65) Prior Publication Data

US 2006/0288648 A1    Dec. 28, 2006

(51) Int. Cl.
B24D 3/00    (2006.01)
B24D 3/28    (2006.01)

(52) U.S. Cl. .............. 51/298; 51/295; 51/307; 51/308; 51/309; 451/28; 451/539

(58) Field of Classification Search ......... 51/307, 51/308, 309, 298, 295; 451/28, 539
See application file for complete search history.

(56) References Cited

U.S. PATENT DOCUMENTS

| | | | |
|---|---|---|---|
| 3,225,013 A | 12/1965 | Fram | |
| 3,989,610 A | 11/1976 | Tsukada et al. | |
| 4,314,827 A | 2/1982 | Leitheiser et al. | |
| 4,396,657 A | 8/1983 | Ibrahim | |
| 4,518,397 A | 5/1985 | Leitheiser et al. | |
| 4,524,181 A | 6/1985 | Adam et al. | |
| 4,588,419 A | 5/1986 | Caul et al. | |
| 4,601,973 A | 7/1986 | Bauer | |
| 4,623,364 A | 11/1986 | Cottringer et al. | |
| 4,652,275 A | 3/1987 | Bloecher et al. | |
| 4,734,104 A | 3/1988 | Broberg | |
| 4,737,163 A | 4/1988 | Larkey | |
| 4,744,802 A | 5/1988 | Schwabel | |
| 4,749,617 A | 6/1988 | Canty | |
| 4,751,138 A | 6/1988 | Tumey et al. | |
| 4,770,671 A | 9/1988 | Monroe et al. | |
| 4,799,939 A | 1/1989 | Bloecher et al. | |
| 4,833,204 A | 5/1989 | Yusa et al. | |
| 4,881,951 A | 11/1989 | Wood et al. | |
| 4,927,431 A | 5/1990 | Buchanan et al. | |
| 4,939,008 A | 7/1990 | Kemski | |
| 4,997,717 A | 3/1991 | Rembold et al. | |
| 5,011,508 A | 4/1991 | Wald et al. | |
| 5,014,468 A | 5/1991 | Ravipati et al. | |
| 5,039,311 A | 8/1991 | Bloecher | |
| 5,078,753 A | 1/1992 | Broberg et al. | |
| 5,086,088 A | 2/1992 | Kitano et al. | |
| 5,090,968 A | 2/1992 | Pellow | |
| 5,108,463 A | 4/1992 | Buchanan | |
| 5,137,542 A | 8/1992 | Buchanan et al. | |
| 5,139,978 A | 8/1992 | Wood | |
| 5,152,917 A | 10/1992 | Pieper et al. | |
| 5,178,646 A | 1/1993 | Barber, Jr. et al. | |
| 5,201,916 A | 4/1993 | Berg et al. | |
| 5,203,884 A | 4/1993 | Buchanan et al. | |
| 5,227,104 A | 7/1993 | Bauer | |
| 5,256,170 A | 10/1993 | Harmer et al. | |
| 5,304,223 A | 4/1994 | Pieper et al. | |
| 5,304,224 A | 4/1994 | Harmon | |
| 5,328,716 A | 7/1994 | Buchanan | |
| 5,360,462 A | 11/1994 | Harmer et al. | |
| 5,366,523 A | 11/1994 | Rowenhorst et al. | |
| 5,378,251 A | 1/1995 | Culler et al. | |
| 5,417,726 A | 5/1995 | Stout et al. | |
| 5,429,647 A | 7/1995 | Larmie | |
| 5,435,816 A | 7/1995 | Spurgeon et al. | |
| 5,436,063 A | 7/1995 | Follett et al. | |
| 5,451,446 A | 9/1995 | Kincaid et al. | |
| 5,490,878 A | 2/1996 | Peterson et al. | |
| 5,492,550 A | 2/1996 | Krishnan et al. | |
| 5,496,386 A | 3/1996 | Broberg et al. | |
| 5,498,269 A | 3/1996 | Larmie | |
| 5,505,747 A | 4/1996 | Chesley et al. | |
| 5,520,711 A | 5/1996 | Helmin | |
| 5,534,391 A | 7/1996 | Wang | |

(Continued)

FOREIGN PATENT DOCUMENTS

| | | |
|---|---|---|
| GB | 2 109 798 A | 6/1983 |
| JP | 5-104449 | 4/1993 |
| WO | WO 00/13853 | 3/2000 |
| WO | WO 00/37569 | 6/2000 |
| WO | WO 02/074492 A2 | 9/2002 |
| WO | WO 02/074839 A2 | 9/2002 |
| WO | WO 02/074839 A3 | 9/2002 |
| WO | WO 03/033212 A1 | 4/2003 |

OTHER PUBLICATIONS

Keipert et al., "Polymerizable Composition and Articles Therefrom", U.S. Appl. No. 10/871,451, Filed Jun. 18, 2004.
Keipert et al., "Coated Abrasive Article With Tie Layer, and Method of Making and Using the Same", U.S. Appl. No. 10/871,455, Filed Jun. 18, 2004.
Keipert et al., "Coated Abrasive Article With Composite Tie Layer, and Method of Making and Using the Same", U.S. Appl. No. 10/871,486, Filed Jun. 18, 2004.

(Continued)

Primary Examiner—Michael Marcheschi
(74) Attorney, Agent, or Firm—Bradford B. Wright (57) ABSTRACT A curable composition comprises epoxy resin preparable by reaction of epichlorohydrin with at least one of bisphenol A or bisphenol F, polyfunctional urethane(meth)acrylate, dicyandiamide and photoinitiator. The curable composition is useful for preparing treated backings and coated abrasive articles.

12 Claims, 1 Drawing Sheet

U.S. PATENT DOCUMENTS

| | | | |
|---|---|---|---|
| 5,549,962 A | 8/1996 | Holmes et al. | |
| 5,551,961 A | 9/1996 | Engen et al. | |
| 5,551,963 A | 9/1996 | Larmie | |
| 5,556,437 A | 9/1996 | Lee et al. | |
| 5,560,753 A | 10/1996 | Schnabel et al. | |
| 5,565,011 A | 10/1996 | Follett et al. | |
| 5,573,619 A | 11/1996 | Benedict et al. | |
| 5,578,095 A | 11/1996 | Bland et al. | |
| 5,578,343 A | 11/1996 | Gaeta et al. | |
| 5,609,706 A | 3/1997 | Benedict et al. | |
| 5,611,825 A | 3/1997 | Engen et al. | |
| 5,643,669 A | 7/1997 | Tsuei | |
| 5,667,541 A | 9/1997 | Klun et al. | |
| 5,672,097 A | 9/1997 | Hoopman | |
| 5,672,186 A | 9/1997 | Chesley et al. | |
| 5,681,217 A | 10/1997 | Hoopman et al. | |
| 5,700,302 A | 12/1997 | Stoetzel et al. | |
| 5,714,259 A | 2/1998 | Holmes et al. | |
| 5,754,338 A | 5/1998 | Wilson et al. | |
| 5,766,277 A | 6/1998 | DeVoe et al. | |
| 5,784,197 A | 7/1998 | Frey et al. | |
| 5,851,247 A | 12/1998 | Stoetzel et al. | |
| 5,853,632 A | 12/1998 | Bunke et al. | |
| 5,855,632 A | 1/1999 | Stoetzel et al. | |
| 5,863,847 A | 1/1999 | De Voe et al. | |
| 5,882,796 A | 3/1999 | Wilson et al. | |
| 5,913,716 A | 6/1999 | Mucci et al. | |
| 5,922,784 A | 7/1999 | De Voe et al. | |
| 5,932,350 A | 8/1999 | Lauer et al. | |
| 5,942,015 A | 8/1999 | Culler et al. | |
| 5,954,844 A | 9/1999 | Law et al. | |
| 5,961,674 A | 10/1999 | Gagliardi et al. | |
| 5,964,979 A | 10/1999 | George et al. | |
| 5,975,988 A | 11/1999 | Christianson | |
| 5,989,111 A | 11/1999 | Lamphere et al. | |
| 6,001,936 A | 12/1999 | Barrera et al. | |
| 6,059,850 A | 5/2000 | Lise et al. | |
| 6,077,601 A | 6/2000 | DeVoe et al. | |
| 6,139,594 A | 10/2000 | Kincaid et al. | |
| 6,200,666 B1 | 3/2001 | Christian et al. | |
| 6,217,432 B1 | 4/2001 | Woo | |
| 6,228,133 B1 | 5/2001 | Thurber et al. | |
| 6,234,875 B1 | 5/2001 | Pendergrass, Jr. | |
| 6,239,049 B1 | 5/2001 | Follensbee et al. | |
| 6,248,815 B1 | 6/2001 | Papsin et al. | |
| 6,258,138 B1 * | 7/2001 | DeVoe et al. | 51/298 |
| 6,261,682 B1 | 7/2001 | Law | |
| 6,277,160 B1 | 8/2001 | Stubbs et al. | |
| 6,287,669 B1 | 9/2001 | George et al. | |
| 6,359,027 B1 * | 3/2002 | Dahlke et al. | 522/153 |
| 6,372,336 B1 | 4/2002 | Clausen et al. | |
| 6,475,253 B2 | 11/2002 | Culler et al. | |
| 6,565,969 B1 | 5/2003 | Lamon et al. | |
| 6,572,971 B2 | 6/2003 | Martin | |
| 6,582,487 B2 | 6/2003 | Larson et al. | |
| 6,605,128 B2 | 8/2003 | Larson et al. | |
| 6,645,624 B2 | 11/2003 | Adefris et al. | |
| 6,833,014 B2 | 12/2004 | Welygan et al. | |
| 6,843,815 B1 | 1/2005 | Thurber et al. | |
| 6,936,083 B2 | 8/2005 | Thurber et al. | |
| 2001/0009952 A1 | 7/2001 | Tan et al. | |
| 2001/0028953 A1 | 10/2001 | Bluem et al. | |
| 2002/0016226 A1 | 2/2002 | Jin et al. | |
| 2002/0098323 A1 | 7/2002 | Larson et al. | |
| 2004/0029511 A1 | 2/2004 | Kincaid et al. | |
| 2005/0060946 A1 | 3/2005 | Collins et al. | |
| 2005/0060947 A1 | 3/2005 | McArdle et al. | |

OTHER PUBLICATIONS

Thurber et al., "Treated Backing and Method of Making the Same", U.S. Appl. No. 11/009,179, Filed Dec. 20, 2004.

Rostal et al., "Abrasive Articles and Methods of Making and Using the Same", U.S. Appl. No. 11/135,766, Filed May 24, 2005.

Thurber et al., "Coated Abrasive Article, and Method of Making and Using the Same", U.S. Appl. No. 11/167,777, Filed Jun. 27, 2005.

Oligomer Selection Guide, Sartomer Co., Exton, Pennsylvania, 1997, 18 pages.

Application Bulletin—Glass Transition Temperatures of Sartomer Products, Sartomer Co., Exton, Pennsylvania, Oct. 1999.

* cited by examiner

COMPOSITION, TREATED BACKING, AND ABRASIVE ARTICLES CONTAINING THE SAME

BACKGROUND

In general, coated abrasive articles have abrasive particles secured to a backing. More typically, coated abrasive articles comprise a backing having two major opposed surfaces and an abrasive layer secured to a major surface. The abrasive layer typically comprises abrasive particles and a binder, wherein the binder serves to secure the abrasive particles to the backing.

One common type of coated abrasive article has an abrasive layer comprising a make layer, a size layer, and abrasive particles. In making such a coated abrasive article, a make layer comprising a first binder precursor is applied to a major surface of the backing. Abrasive particles are then at least partially embedded into the make layer (e.g., via electrostatic coating), and the first binder precursor is cured (i.e., crosslinked) to secure the particles to the make layer. A size layer comprising a second binder precursor is then applied over the make layer and abrasive particles, followed by curing of the binder precursors. Some coated abrasive articles further comprise a supersize layer covering the abrasive layer. The supersize layer typically includes grinding aids and/or anti-loading materials.

Another common type of coated abrasive article comprises an abrasive layer secured to a major surface of a backing, wherein the abrasive layer is provided by applying a slurry comprised of binder precursor and abrasive particles onto a major surface of a backing, and then curing the binder precursor.

Some coated abrasive articles further comprise a backing treatment such as a backsize layer (i.e., a coating on the major surface of the backing opposite the major surface having the abrasive layer), a presize layer, a tie layer (i.e., a coating between the abrasive layer and the major surface to which the abrasive layer is secured), and/or a saturant. Optionally, the backing may further comprise a subsize treatment. A subsize is similar to a saturant except that it is applied to a previously treated backing.

Conventional backing treatments used in coated abrasive constructions include resole phenolic resins, phenolic/latex blends, urea-formaldehyde, and melamine formaldehyde resins. Backing treatments such as these typically exhibit good adhesion to resole phenolic, urea-formaldehyde, and epoxy based make layers and slurry layers. However since these types of backing treatments are typically only partially cured prior to the make coat application, they typically emit various volatiles such as water, phenol, and formaldehyde that can impart additional porosity to the abrasive layer, particles and/or interfere with curing of the make layer.

During use, the temperature of coated abrasives typically rises due to frictional heating. Such heating may lead to problems such as the abrasive layer separating from the backing, whether the backing is treated or not.

SUMMARY

In one aspect, the present invention provides a curable composition comprising, based on the total weight of components a) through f):

a) from 20 to 65 percent by weight of epoxy resin preparable by reaction of epichlorohydrin with at least one of bisphenol A or bisphenol F;

b) from 29 to 75 percent by weight of polyfunctional urethane(meth)acrylate;
c) from 0.1 to 15 percent by weight of novolac resin;
d) dicyandiamide;
e) photoinitiator; and
f) optional epoxy cure catalyst.

In another aspect, the present invention provides a treated backing comprising a fabric having a composition contacting at least a portion thereof, wherein, based on the total weight of components a) through f), the composition comprises a reaction product of components comprising:

a) from 20 to 65 percent by weight of epoxy resin preparable by reaction of epichlorohydrin with at least one of bisphenol A or bisphenol F;

b) from 29 to 75 percent by weight of polyfunctional urethane(meth)acrylate;
c) from 0.1 to 15 percent by weight of novolac resin;
d) dicyandiamide;
e) photoinitiator; and
f) optional epoxy cure catalyst.

In yet another aspect, the present invention provides a method of making a treated backing comprising:

contacting at least a portion of a fabric with a curable composition, based on the total weight of components a) through f), preparable from components comprising:

a) from 20 to 65 percent by weight of epoxy resin preparable by reaction of epichlorohydrin with at least one of bisphenol A or bisphenol F;

b) from 29 to 75 percent by weight of polyfunctional urethane(meth)acrylate;
c) from 0.1 to 15 percent by weight of novolac resin;
d) dicyandiamide;
e) photoinitiator; and
f) optional epoxy cure catalyst; and
at least partially curing the composition.

In yet another aspect, the present invention provides a coated abrasive article comprising a backing and an abrasive layer, further comprising at least one of a presize layer, a saturant, a subsize, a backsize layer, or a tie layer that comprising a binder that, based on the total weight of components a) through f), is a reaction product of components comprising:

a) from 20 to 65 percent by weight of epoxy resin preparable by reaction of epichlorohydrin with at least one of bisphenol A or bisphenol F;

b) from 29 to 75 percent by weight of polyfunctional urethane(meth)acrylate;
c) from 0.1 to 15 percent by weight of novolac resin;
d) dicyandiamide;
e) photoinitiator; and
f) optional epoxy cure catalyst.

In one embodiment, the abrasive layer comprises make and size layers.

In another embodiment, the abrasive particles are dispersed in the binder.

In yet another aspect, the present invention provides a method of making a coated abrasive article comprising:

disposing a backing treatment precursor on at least a portion of a backing, the backing treatment precursor comprising, based on the total weight of components a) to f):

a) from 20 to 65 percent by weight of epoxy resin preparable by reaction of epichlorohydrin with at least one of bisphenol A or bisphenol F;

b) from 29 to 75 percent by weight of polyfunctional urethane(meth)acrylate;
c) from 0.1 to 15 percent by weight of novolac resin;
d) dicyandiamide;

e) photoinitiator; and f) optional epoxy cure catalyst; and at least partially polymerizing the backing treatment precursor;

disposing a slurry comprising polymerizable binder precursor and abrasive particles on the at least partially polymerized backing treatment precursor; and at least partially polymerizing the binder precursor.

Coated abrasives according to the present invention are useful for abrading a workpiece by a method comprising:

providing a coated abrasive article according to the present invention;

frictionally contacting at least a portion of the abrasive layer with at least a portion of a surface of the workpiece; and moving at least one of the coated abrasive article or the workpiece relative to the other to abrade at least a portion of the surface.

DETAILED DESCRIPTION

Curable compositions according to one aspect of the present invention comprise: a) from 20 to 65 percent by weight of at least one epoxy resin preparable by reaction of epichlorohydrin with at least one of bisphenol A or bisphenol F; b) from 29 to 75 percent by weight of polyfunctional urethane(meth)acrylate; c) from 0.1 to 15 percent by weight of novolac resin; d) dicyandiamide; e) photoinitiator; and f) optional epoxy cure catalyst, based on the total weight of components a) through f).

Curable compositions according to the present invention comprise from 20 to 65 percent by weight of at least one epoxy resin preparable by reaction of epichlorohydrin with at least one of bisphenol A or bisphenol F, based on the total weight of components a) through f). For example, compositions according to the present invention may comprise from 20 to 30, or 55 to 65 percent by weight of at least one epoxy resin preparable by reaction of epichlorohydrin with at least one of bisphenol A or bisphenol F, based on the total weight of components a) through f). Typically, such resins have an average epoxy functionality of two, although higher and lower functionalities may also be useful.

The epoxy resin may be liquid or solid. Whether liquid or solid, the epoxy resin may be chosen to be soluble in compositions according to the present invention. In some instances, heating compositions according to the present invention may facilitate dissolution of the epoxy resin.

Examples of useful epoxy resins include the epoxy resins formed by reaction of bisphenol A or bisphenol F with epichlorohydrin, and mixtures of such resins. Examples of bisphenol A-epichlorohydrin derived epoxy resins, bisphenol A diglycidyl ether (commonly referred to in the art as DGEBA) and bisphenol F diglycidyl ether and commercially available epoxy resins having the trade designation "EPON" (e.g., "EPON RESIN 825", "EPON RESIN 828", "EPON RESIN 1001F", "EPON RESIN 1002F", "EPON RESIN 1004F", "EPON RESIN 1009F", and "EPON RESIN 2003"), marketed by Resolution Performance Products, Houston, Tex. and many epoxy resins having the trade designation "D.E.R." (e.g., "D.E.R. 331", "D.E.R. 332", "D.E.R. 351", "D.E.R. 352", "D.E.R. 354", and "D.E.R. 356"), marketed by Dow Chemical Company, Midland, Mich.

Curable compositions according to the present invention comprise from 29 to 75 percent by weight of at least one polyfunctional urethane(meth)acrylate, based on the total weight of components a) through f). For example, curable compositions according to the present invention may comprise from 29 to 40, or from 55 to 75 percent by weight of polyfunctional urethane(meth)acrylate, based on the total weight of components a) through f). The polyfunctional urethane(meth)acrylate has an acrylate functionality of at least two, for example, at least 3, 4, or even 5, and may be a blend of more than one polyfunctional urethane(meth)acrylate.

Exemplary useful urethane(meth)acrylate oligomers include aliphatic urethane acrylate oligomers (e.g., as marketed by UCB Radcure under the trade designations "EBECRYL 230", "EBECRYL 270", "EBECRYL 1290", "EBECRYL 4842", "EBECRYL 5129", "EBECRYL 8301", "EBECRYL 8402", "EBECRYL 8804", "EBECRYL 8807"), and aromatic urethane acrylate oligomers (e.g., as marketed by UCB Radcure under the trade designations "EBECRYL 220", "EBECRYL 4827", "EBECRYL 4849", and "EBECRYL 6700").

Curable compositions according to the present invention may further comprise one or more polyfunctional non-urethane(meth)acrylate monomers. Examples include ethylene glycol di(meth)acrylate, hexanediol di(meth)acrylate, triethylene glycol di(meth)acrylate, trimethylolpropane tri(meth)acrylate, glycerol tri(meth)acrylate, pentaerythritol tri(meth)acrylate, ethoxylated trimethylolpropane tri(meth)acrylate, neopentyl glycol di(meth)acrylate, pentaerythritol tetra(meth)acrylate, dipentaerythritol penta(meth)acrylate, sorbitol tri(meth)acrylate, sorbitol hexa(meth)acrylate, Bisphenol A di(meth)acrylate, ethoxylated Bisphenol A di(meth)acrylates, acrylated epoxy oligomers (e.g., Bisphenol-A based epoxy acrylate oligomers such as, for example, those marketed under the trade designations "EBECRYL 3500", "EBECRYL 3600", "EBECRYL 3720", and "EBECRYL 3700" by UCB Radcure), and acrylated polyesters (e.g., as marketed by UCB Radcure under the trade designation "EBECRYL 870"), and mixtures thereof.

Curable compositions according to the present invention comprises from 0.1 to 15 percent by weight or more of at least one novolac phenolic resin, based on the total weight of components a) to f). For example, the composition may comprise from 1 to 6 percent by weight or more of one or more novolac phenolic resins, based on the total weight of components a) to f).

Typically, novolac resins are made by reacting a phenolic monomer (e.g., phenol, cresol, xylenol, resorcinol, catechol, bisphenol A, naphthol, or a combination thereof) with an aldehyde in the presence of an acid catalyst, with the molar ratio of the aldehyde to phenol being less than one. Examples of aldehydes used to prepare novolacs include formaldehyde, acetaldehyde, propionaldehyde, glyoxal, and furfural. Typically, these novolac resins have a molecular weight ranging from 300 to 1,500, although higher and lower molecular weights may also be useful. Additionally, the starting phenolic monomer can be substituted with various groups such as alkyl, alkoxy, carboxyl, and sulfo, as long as there are at least two reactive sites remaining to form the novolac.

Many novolac phenolic resins are readily available from commercial suppliers including, for example, Georgia Pacific Resins, Atlanta, Ga. (e.g., as marketed under the trade designations "GP 2074", "GP 5300", "GP 5833", "RESI-FLAKE GP-2049", "RESI-FLAKE GP-2050", or "RESI-FLAKE GP-221 1"); Bakelite AG, Frielendorf, Germany (e.g., as marketed under the trade designation "RUTAPHEN 8656F"); Borden Chemical, Inc (e.g., as marketed under the trade designations "DURITE 423A" or "DURITE SD1731"). While novolac resins are typically useful, resole phenolic resins may tend to interfere with curing of curable compositions according to the present invention, and if included should be used with discretion.

Curable compositions according to the present invention comprise an effective amount of dicyandiamide for curing the composition. For example, the curable composition may comprise from 0.5, 1, 2, or 5 percent up to 10, even 15 percent by weight of dicyandiamide, based on the total weight of components a) through f). Dicyandiamide is widely available commercially, for example, as marketed by Air Products and Chemicals, Allentown, Pa. under the trade designations "AMICURE CG-1200" and "AMICURE CG-1400".

Curable compositions according to the present invention comprise an effective amount of photoinitiator for curing the composition. For example, the curable composition may comprise from 0. 1, 1, or 3 percent by weight, up to 5, 7, or even 10 percent or more by weight of photoinitiator, based on the total weight of components a) through f).

Photoinitiator may be a single photoinitiator or a combination of two or more photoinitiators. Photoinitiators useful in the practice of invention include those known as useful for photocuring free-radically polyfunctional urethane(meth) acrylates. Exemplary photoinitiators include benzoin and its derivatives such as α-methylbenzoin; α-phenylbenzoin; α-allylbenzoin; α-benzylbenzoin; benzoin ethers such as benzil dimethyl ketal (available, for example, under the trade designation "IRGACURE 651" from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available, for example, under the trade designation "DAROCUR 1173" from Ciba Specialty Chemicals) and 1-hydroxycyclohexyl phenyl ketone (available, for example, under the trade designation "IRGACURE 184" from Ciba Specialty Chemicals); 2-methyl-1-[4-(methylthio)phenyl]-2-(4-morpholinyl)-1-propanone (available, for example, under the trade designation "IRGACURE 907" from Ciba Specialty Chemicals); 2-benzyl-2-(dimethylamino)-1-[4-(4-morpholinyl)phenyl]-1-butanone (available, for example, under the trade designation "IRGACURE 369" from Ciba Specialty Chemicals).

Other useful photoinitiators include pivaloin ethyl ether, anisoin ethyl ether; anthraquinones, such as anthraquinone, 2-ethylanthraquinone, 1-chloroanthraquinone, 1,4-dimethylanthraquinone, 1-methoxyanthraquinone, benzanthraquinonehalomethyltriazines, and the like; benzophenone and its derivatives; iodonium salts and sulfonium salts as described hereinabove; titanium complexes such as bis($\eta_5$-2,4-cyclopentadien-1-yl)bis[2,6-difluoro-3-(1H-pyrrol-1-yl)phenyl] titanium (obtained under the trade designation "CGI 784 DC", also from Ciba Specialty Chemicals); halomethylnitrobenzenes such as 4-bromomethylnitrobenzene and the like; mono- and bis-acylphosphines (available, for example, from Ciba Specialty Chemicals under the trade designations "IRGACURE 1700", "IRGACURE 1800", "IRGACURE 1850", and "DAROCUR 4265").

In some instances, it may be useful to include epoxy cure catalyst in compositions according to the present invention. Epoxy cure catalysts are well known and include imidazoles such as, for example, 2-ethylimidazole, and 2-ethyl-4-methylimidazole (e.g., as marketed under the trade designation "IMICURE EMI-2,4" by Air Products and Chemicals, Allentown, Pa., and 2-propylimidazole (e.g., as marketed under the trade designation "ACTIRON NXJ-60" by Synthron, Morganton, N.C.); and Lewis acid complexes such as boron trifluoride and boron trichloride complexes including, for example, $BF_3$.diethylamine and a $BCl_3$.amine complex marketed under the trade designation "OMICURE BC-120" by CVC Specialty Chemicals, Maple Shade, N.J.

Other known epoxy cure catalysts include aliphatic and aromatic tertiary amines including, for example, dimethylpropylamine, pyridine, dimethylaminopyridine, and dimethylbenzylamine.

If included, the amount of epoxy cure catalyst typically is typically in an amount of from 0.1 to 2 percent by weight, based on the total weight of components a) through f), although higher and lower amounts may also be useful.

Curable compositions according to the present invention may optionally include one or more epoxidized toughening agents. Useful epoxidized toughening agents include, for example, epoxidized rubber (e.g., as marketed under the trade designation "HYPOX RA1340" by CVC Specialty Chemicals), urethane rubber modified epoxy resins (e.g., as marketed under the trade designation "PACIFIC 6246 FLEXIBLE EPOXY RESIN" or "PACIFIC 6246 FLEXIBLE EPOXY RESIN HV" by Pacific Epoxy Polymers, Richmond, Mo.); and epoxidized polybutadienes (e.g., as marketed under the trade designation "OXIRON 2001" by FMC Corporation, Philadelphia, Pa., or under the trade designations "POLY BD 600E" and "POLY BD 605E" by Atofina Chemicals, Philadelphia, Pa.).

Curable compositions according to the present invention may further comprise an optional bireactive polymerizable component, for example, a compound having at least one free-radically polymerizable group, and at least one cationically polymerizable group. Bireactive compounds can be made, for example, by introducing at least one ethylenically unsaturated group into a compound that already contains one or more epoxy groups, or, conversely, by introducing at least one epoxy group into a compound that already contains one or more ethylenically unsaturated group.

Curable compositions according to the present invention may contain a variety of additives such as, for example, fillers, thickeners, tougheners, grinding aids, pigments, fibers, tackifiers, lubricants, wetting agents, surfactants, antifoaming agents, dyes, coupling agents, plasticizers, and suspending agents.

In applications in which low viscosity is desirable, such as, for example, as a backing treatment, curable compositions according to the present invention may be essentially free of dissolved thermoplastic polymers (e.g., thermoplastic polymers having a weight average molecular weight of 5,000 or more), as such materials tend to greatly increase viscosity, which may make coating processes difficult (e.g., saturating a porous backing).

Curable compositions according to the present invention may be applied to a variety of substrates using conventional methods such as, for example, roll coating (e.g., using soft rubber rolls), spraying, transfer coating, dip coating, screen printing, gravure coating, curtain coating, bar coating, knife coating, or die coating. Curable compositions may be applied to a substrate in a uniform or patterned manner, and may be continuous or discontinuous.

If utilizing curable compositions comprising solid components, such compositions may be prepared, for example, by mixing some or all of the various materials of the curable composition in a suitable vessel at an elevated temperature, for example, less than 100° C., sufficient to liquify at least some of the materials so that they may be efficiently mixed, with stirring, to form the curable composition, but without thermally degrading the components.

Curable compositions may be cured by exposure to thermal energy, actinic radiation, or more typically a combination thereof. In such cases, curing of the curable composition typically begins upon exposing it to an appropriate source of actinic radiation (e.g., ultraviolet, visible, or particulate radiation), and may continue for a period thereafter.

Useful forms of thermal energy include, for example, heat and infrared radiation. Exemplary sources of thermal energy include ovens, heated rolls, hot air blowers, infrared lamps, and combinations thereof.

The choice of the source of actinic radiation is typically selected depending on the intended processing conditions, and to appropriately activate the photoinitiator. Exemplary useful sources of ultraviolet and visible radiation include mercury, xenon, carbon arc, tungsten filament lamps, and sunlight. Ultraviolet radiation, especially from a medium pressure mercury arc lamp or a microwave driven H-type, D-type, or V-type mercury lamp, such as of those commercially available from Fusion UV Systems, Gaithersburg, Md., is especially desirable.

Exposure times for the actinic radiation typically range, for example, from less than about 0.01 second to 1 minute or longer providing, for example, a total energy exposure from 0.1 to 10 Joules per square centimeter (J/cm$^2$) depending upon the amount and the type of reactive components involved, the energy source, web speed, the distance from the energy source, and the thickness of the make layer to be cured. Filters and/or dichroic reflectors may also be useful, for example, to reduce thermal energy that accompanies the actinic radiation.

If electron beam radiation is used, the dosage necessary is generally from less than 1 megarad to 100 megarads or more.

Curable compositions according to the present invention may be applied to a backing, for example, for use as a treated backing in the manufacture of coated abrasive articles. Such treated backings are typically prepared by applying a curable composition according to the present invention (i.e., a backing treatment precursor) to at least a portion of a backing and at least partially curing the curable composition. For example, if the backing has opposed two major surfaces, the curable composition may be applied in such a manner as to contact only one of the major surfaces or in such a manner as to contact both major surfaces (e.g., by saturating the fabric with curable composition or both applying a curable composition to each major surface of the backing).

Useful backings include, for example, fabrics such as nonwoven (e.g., including needletacked, meltspun, spunbonded, hydroentangled, or meltblown nonwoven fabrics), knitted, stitchbonded, and woven fabrics (e.g., cloth); paper; mesh; polymeric film (including primed films) such as polyolefin film (e.g., polypropylene including biaxially oriented polypropylene, polyester film, polyamide film, cellulose ester film); foil; foam (e.g., natural sponge material or polyurethane foam); combinations of two or more of these materials; and treated versions thereof. The backing may also be a laminate of two materials (e.g., paper/film, cloth/paper, film/cloth).

Useful fibrous backings can be made from any known fibers, whether natural, synthetic or a blend of natural and synthetic fibers. Examples of useful fiber materials include fibers or yarns comprising polyester (e.g., polyethylene terephthalate), polyamide (e.g., hexamethylene adipamide, polycaprolactam), polypropylene, acrylic (formed from a polymer of acrylonitrile), cellulose acetate, polyvinylidene chloride-vinyl chloride copolymers, vinyl chloride-acrylonitrile copolymers, graphite, polyimide, silk, cotton, linen, jute, hemp, or rayon. Useful fibers may be of virgin materials or of recycled or waste materials reclaimed from garment cuttings, carpet manufacturing, fiber manufacturing, or textile processing, for example. Useful fibers may be homogenous or a composite such as a bicomponent fiber (e.g., a co-spun sheath-core fiber). The fibers may be tensilized and crimped, but may also be continuous filaments such as those formed by an extrusion process.

Treated backings according to the present invention are typically flexible. The thickness of the backing generally ranges from about 0.02 to about 5 millimeters, desirably from about 0.05 to about 2.5 millimeters, and more desirably from about 0.1 to about 0.4 millimeter, although thicknesses outside of these ranges may also be useful, for example, depending on the intended use. The strength of the backing should be sufficient to resist tearing or other damage in use. The thickness and smoothness of the backing should also be suitable to provide the desired thickness and smoothness of the coated abrasive article, wherein such characteristics of the coated abrasive article may vary depending, for example, on the intended application or use of the coated abrasive article.

Treated backings may have any basis weight. Treated backings comprising fabric having a basis weight in a range of from 100 to 400 grams per square meter typically have good flexibility and may be well-suited for inclusion in coated abrasive articles, however higher and lower basis weights may also have good flexibility. Examples of such treated backings include those comprising fabric that has a basis weight in a range of from 200 to 270 grams per square meter, and those that have a basis weight in a range of from 210 to 230 grams per square meter.

The quantity of curable composition applied to the backing may be any amount, again depending upon the specific application.

Curable compositions and treated backings according to the present invention are also useful in the manufacture of coated abrasive articles, wherein they may provide good adhesion between the abrasive layer and the backing.

Figure 1:
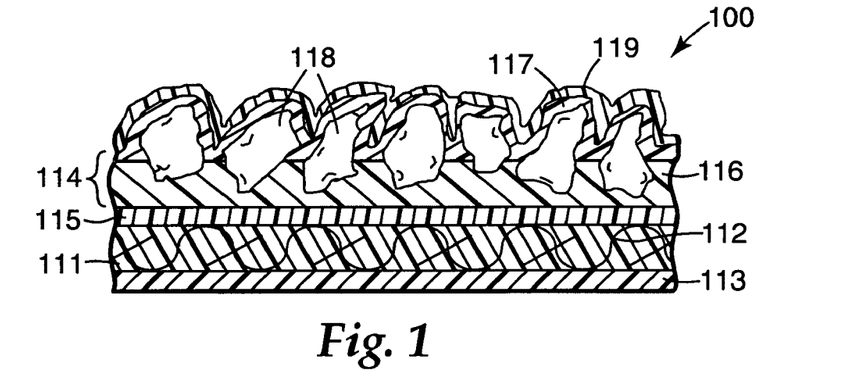
FIG. 1 is a cross-sectional side view of an exemplary coated abrasive article according to the present invention.

One such coated abrasive article is illustrated in FIG. 1. Referring now to FIG. 1, exemplary coated abrasive article 100 comprises backing 112. Backing 112 may optionally be saturated with saturant 111. Additionally, backing 112 may be treated with optional backsize layer 113 and/or optional presize layer 115. In the case that backing 112 is porous, backsize layer 113 and presize layer 115 penetrate into the backing, and may even contact each other within the porous interior of the backing in some cases. Overlaying presize layer 115 is abrasive layer 114 comprising make layer 116 in which are embedded abrasive grits 118 and size layer 117 which overlays make layer 116 and abrasive grits 118. Optional supersize layer 119 overlays size layer 117.

Figure 2:
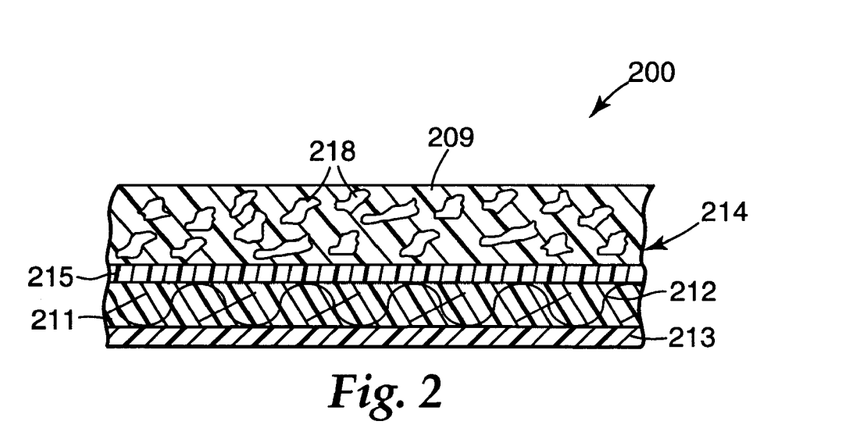
FIG. 2 is a cross-sectional side view of another exemplary coated abrasive article according to the present invention.

Another exemplary coated abrasive article according to the present invention FIG. 2. Referring now to FIG. 2, coated abrasive article 200 comprises backing 212. Backing 212 may optionally be saturated with saturant 211. Additionally, backing 212 may be treated with optional backsize layer 213 and/or optional presize layer 215. In the case that backing 212 is porous, backsize layer 213 and presize layer 215 penetrate into the backing, and may even contact each other within the porous interior of the backing in some cases. Overlaying presize layer 215 is abrasive layer 214, which includes a plurality of abrasive grits 218 distributed throughout binder 209.

Binders comprising a reaction product of curable compositions according to the present invention may be used, for example, as one or more of a saturant, subsize, presize layer, backsize layer. The purpose of these materials is typically to seal the backing, protect yarn or fibers in the backing, and/or promote adhesion of other layer(s) to the backing. If the backing is a fabric, at least one of these materials is typically used. The addition of the presize layer or backsize layer may additionally result in a "smoother" surface on either the front and/or the backside of the backing.

The good adhesion of binders comprising a reaction product of curable compositions according to the present invention to backings may also make them suitable for use as a tie layer, or in an abrasive layer. For example, curable compositions according to the present invention may be applied onto a backing as a make coat or a slurry coat, and then at least partially cured at an appropriate point in the manufacturing process to form a make layer or a binder having abrasive particles distributed therein.

For use in coated abrasive articles, the thickness of the backing generally ranges from 0.02 to 5 millimeters, for example, from 0.05 to 2.5 millimeters, or from 0.1 to 1 millimeter, although thicknesses outside of these ranges may also be useful.

In addition to the fabrics used to make treated backings discussed above, useful backings for manufacture of coated abrasive articles include polymeric films (including primed film) such as polyolefin film (e.g., polypropylene including biaxially oriented polypropylene, polyester film, polyamide film, cellulose ester film), metal foil, mesh, foam (e.g., natural sponge material or polyurethane foam), paper, coated paper, and combinations thereof.

The backing may also be a laminate of two materials (e.g., paper/film, cloth/paper, or film/cloth). The backing may also be a fibrous reinforced thermoplastic such as described, for example, as described, for example, in U.S. Pat. No. 5,417, 726 (Stout et al.), or an endless spliceless belt, as described, for example, in U.S. Pat. No. 5,573,619 (Benedict et al.), the disclosures of which are incorporated herein by reference.

The backing may be a polymeric substrate having hooking stems projecting therefrom such as that described, for example, in U.S. Pat. No. 5,505,747 (Chesley et al.), or the backing may be a loop fabric such as that described, for example, in U.S. Pat. No. 5,565,011 (Follett et al.), the disclosures of which are incorporated herein by reference.

The choice of backing material may depend on the intended application of the coated abrasive article. The thickness and smoothness of the backing should also be suitable to provide the desired thickness and smoothness of the coated abrasive article, wherein such characteristics of the coated abrasive article may vary depending, for example, on the intended application or use of the coated abrasive article.

An antistatic material may be included in any of these backing treatment materials. The addition of an antistatic material can reduce the tendency of the coated abrasive article to accumulate static electricity when sanding wood or wood-like materials. Additional details regarding antistatic backings and backing treatments can be found in, for example, U.S. Pat. No. 5,108,463 (Buchanan et al.); U.S. Pat. No. 5,137,542 (Buchanan et al.); U.S. Pat. No. 5,328, 716 (Buchanan); and U.S. Pat. No. 5,560,753 (Buchanan et al.), the disclosures of which are incorporated herein by reference.

In some instances, it may be desirable to incorporate a pressure-sensitive adhesive onto the backside of the coated abrasive article such that the resulting coated abrasive article can be secured to a back up pad. Exemplary pressure-sensitive adhesives include latex crepe, rosin, acrylic polymers, and copolymers including polyacrylate esters (e.g., poly(butyl acrylate)), vinyl ethers (e.g., poly(vinyl n-butyl ether)), alkyd adhesives, rubber adhesives (e.g., natural rubber, synthetic rubber, chlorinated rubber), and mixtures thereof.

To promote adhesion of binder resins to the backing, one or more surfaces of the backing may be modified by known methods including corona discharge, ultraviolet light exposure, electron beam exposure, flame discharge, and/or scuffing.

Details concerning coated abrasive articles comprising abrasive particles and make, size, and optional supersize layers are well known and are described, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152, 917 (Pieper et al.); U.S. Pat. No. 5,378,251 (Culler et al.); U.S. Pat. No. 5,417,726 (Stout et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,954, 844 (Law et al.); U.S. Pat. No. 5,961,674 (Gagliardi et al.); U.S. Pat. No. 4,751,138 (Bange et al.); U.S. Pat. No. 5,766,277 (DeVoe et al.); U.S. Pat. No. 6,077,601 (DeVoe et al.); U.S. Pat. No. 6,228,133 (Thurber et al.); and U.S. Pat. No. 5,975,988 (Christianson), the disclosures of which are incorporated herein by reference.

The basis weight of the make layer utilized may depend, for example, on the intended use(s), type(s) of abrasive particles, and nature of the coated abrasive article being prepared, but generally will be in the range of from 1, 2, or 5 to 20, 25, 400, or even 600 grams per square meter (i.e., $g/m^2$). The make layer may be applied by any known coating method for applying a make layer to a backing, including, for example, roll coating, extrusion die coating, curtain coating, knife coating, gravure coating, and spray coating.

After applying the make layer to the backing, and prior to solidification of the make layer (e.g., by curing), abrasive particles are deposited onto the make layer.

Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. Examples of sol-gel abrasive particles include those described U.S. Pat. No. 4,314,827 (Leitheiser et al.); U.S. Pat. No. 4,518,397 (Leitheiser et al.); U.S. Pat. No. 4,623,364 (Cottringer et al.); U.S. Pat. No. 4,744,802 (Schwabel); U.S. Pat. No. 4,770,671 (Monroe et al.); U.S. Pat. No. 4,881,951 (Wood et al.); U.S. Pat. No. 5,011,508 (Wald et al.); U.S. Pat. No. 5,090,968 (Pellow); U.S. Pat. No. 5,139,978 (Wood); U.S. Pat. No. 5,201,916 (Berg et al.); U.S. Pat. No. 5,227,104 (Bauer); U.S. Pat. No. 5,366,523 (Rowenhorst et al.); U.S. Pat. No. 5,429,647 (Larmie); U.S. Pat. No. 5,498,269 (Larmie); and U.S. Pat. No. 5,551,963 (Larmie), the disclosures of which are incorporated herein by reference. The abrasive particles may be in the form of, for example, individual particles, agglomerates, abrasive composite particles, and mixtures thereof.

Exemplary agglomerates are described, for example, in U.S. Pat. No. 4,652,275 (Bloecher et al.) and U.S. Pat. No. 4,799,939 (Bloecher et al.), the disclosures of which are incorporated herein by reference. It is also within the scope of the present invention to use diluent erodible agglomerate grains as described, for example, in U.S. Pat. No. 5,078,753 (Broberg et al.), the disclosure of which is incorporated herein by reference. Abrasive composite particles comprise abrasive grains in a binder.

Exemplary abrasive composite particles are described, for example, in U.S. Pat. No. 5,549,962 (Holmes et al.), the disclosure of which is incorporated herein by reference.

Coating weights for the abrasive particles may depend, for example, on the specific coated abrasive article desired, the process for applying the abrasive particles, and the size of the abrasive particles, but typically range from 1 to 2000 g/m$^2$.

The basis weight of the size layer will also necessarily vary depending on the intended use(s), type(s) of abrasive particles, and nature of the coated abrasive article being prepared, but generally will be in the range of from 1 or 5 g/m$^2$ to 300, or even 800 g/m$^2$, or more. The size layer may be applied by any known coating method for applying a size layer to a backing including, for example, roll coating, extrusion die coating, curtain coating, and spray coating.

In some embodiments of coated abrasive articles according to the present invention, the abrasive layer comprises a dispersion of abrasive particles and binder that is the reaction product of a curable composition according to the present invention (typically coated as a slurry). Slurry coating techniques are well known in the abrasive art, and include those described, for example, in U.S. Pat. No. 5,378,251 (Culler et al.); U.S. Pat. No. 5,942,015 (Culler et al.); and U.S. Pat. No. 6,277,160 (Stubbs et al.); the disclosures of which are incorporated herein by reference.

In some embodiments of coated abrasive articles according to the present invention, the abrasive layer comprises abrasive composites, which in some embodiments are precisely-shaped.

Figure 3:
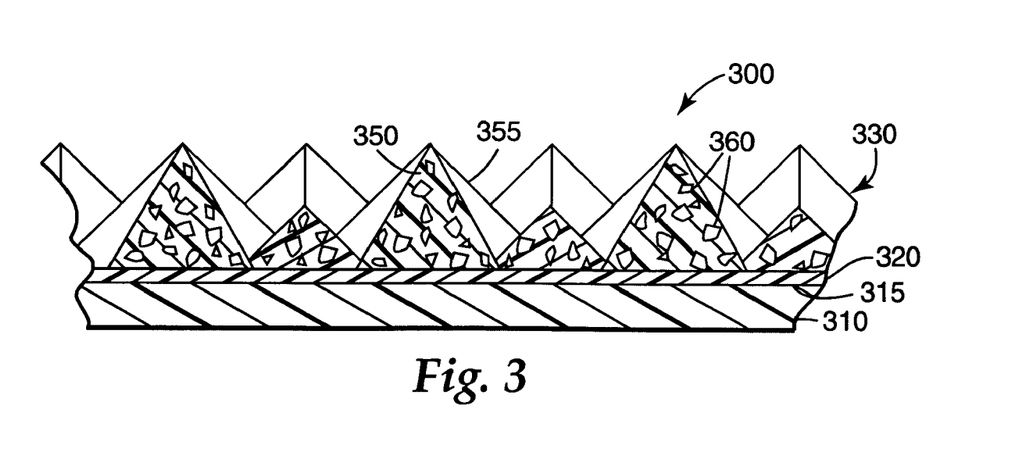
FIG. 3 is a cross-sectional side view of another exemplary coated abrasive article according to the present invention.

Accordingly, in another exemplary embodiment, a coated abrasive article according to the present invention may have an abrasive layer that comprises precisely shaped abrasive composites (e.g., a structured abrasive article). Referring now to FIG. 3, exemplary structured abrasive article 300 has backing 310, backing treatment 320 according to the present invention secured to major surface 315 of backing 310, and abrasive layer 330 secured to tie layer 320. Abrasive layer 330 includes a plurality of precisely-shaped abrasive composites 355. The abrasive composites comprise abrasive particles 360 dispersed in binder 350.

In making such a coated abrasive article, a slurry comprising a binder precursor and abrasive particles may be applied to a tool having a plurality of precisely-shaped cavities therein. The slurry is then at least partially polymerized and adhered to the tie layer, for example, by adhesive or addition polymerization of the slurry. Suitable binder precursors and abrasive particles include, for example, those listed hereinabove.

The abrasive composites may be of any three-dimensional shape that results in at least one of a raised feature or recess on the exposed surface of the abrasive layer. Useful shapes include, for example, cubic, prismatic, pyramidal (e.g., square pyramidal or hexagonal pyramidal), truncated pyramidal, conical, cruciform, hemispherical, frusto-conical. Combinations of differently shaped and/or sized abrasive composites may also be used. The abrasive layer of the structured abrasive may be continuous or discontinuous.

For fine finishing applications, the density of abrasive composites in the abrasive layer is typically in a range of from at least 1,000, 10,000, or even at least 20,000 abrasive composites per square inch (.e., at least 150, 1,500, or even 7,800 abrasive composites per square centimeter) up to and including 50,000, 70,000, or even as many as 100,000 abrasive composites per square inch (up to and including 7,800, 11,000, or even as many as 15,000 abrasive composites per square centimeter), although greater or lesser densities of abrasive composites may also be used.

Further details concerning coated abrasive article having abrasive layers comprising precisely-shaped abrasive composites may be found, for example, in U.S. Pat. No. 5,152,917 (Pieper et al.); U.S. Pat. No. 5,435,816 (Spurgeon et al.); U.S. Pat. No. 5,672,097 (Hoopman); U.S. Pat. No. 5,681,217 (Hoopman et al.); U.S. Pat. No. 5,851,247 (Stoetzel et al.); and U.S. Pat. No. 6,139,594 (Kincaid et al.), the disclosures of which are incorporated herein by reference.

Coated abrasive articles according to the present invention can be converted, for example, into belts, tapes, rolls, discs (including perforated discs), and/or sheets. For belt applications, two free ends of the abrasive sheet may be joined together using known methods to form a spliced belt. A spliceless belt may also be formed as described, for example, in U.S. Pat. No. 5,573,619 (Benedict et al.), the disclosure of which is incorporated herein by reference.

Coated abrasive articles according to the present invention are useful for abrading a workpiece. One such method includes frictionally contacting at least a portion of the abrasive layer of a coated abrasive article with at least a portion of a surface of the workpiece, and moving at least one of the coated abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades.

Coated abrasive articles according to the present invention may be used by hand and/or used in combination with a machine. At least one or both of the coated abrasive article and the workpiece is generally moved relative to the other when abrading.

Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, and/or the like.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used throughout the Examples:

"ADHCUR1": modified polyamide amine, commercially available under the trade designation "VERSAMIDE 125" from Cognis Corp., Cincinnati, Ohio;

"ADHCUR2": modified aliphatic amine, commercially available under the trade designation "ANCAMINE AD CURING AGENT" from Air Products and Chemicals, Allentown, Pa.;

"AFR1": acidic aromatic acrylate oligomer, commercially available under the trade designation "PHOTOMER 4173" from Cognis Corp.;

"AZ1": polyfunctional aziridine commercially available under the trade designation from "HYDROFLEX XR-2290" from H.B. Fuller Company, Vadnais Heights, Minn.;

"ACR1": acrylated aliphatic urethane, obtained under the trade designation "EBECRYL 8402" from UCB Radcure, Smyrna, Ga.;

"ACR2": aliphatic urethane diacrylate, obtained under the trade designation "EBECRYL 270" from UCB Radcure;

"ACR3": trimethylolpropane triacrylate, obtained under the trade designation "TMPTA-N" from UCB Radcure;

"ACR4": trimethylolpropane triacrylate obtained under the trade designation "SR351" from Sartomer Company, Exton, Pa.;

"DICY": dicyandiamide (having an average particle size of less than 10 micrometers), obtained under the trade designation "AMICURE CG-1400" from Air Products and Chemicals;

"CPA1": a silane coupling agent, obtained under the trade designation "SILANE A-174NT" from GE-Silicones, Friendly, W. Va.;

"CUR1": 2-propylimidazole, obtained under the trade designation "ACTIRON NXJ-60 LIQUID" from Synthron, Inc., Morganton, N.C.;

"EP1": bisphenol A epoxy functional material, obtained under the trade designation "EPON 828" from Resolution Performance Products, Houston, Tex.;

"FIL1": calcium metasilicate, obtained under the trade designation "400 WOLLASTACOAT" from NYCO Minerals Inc., Willsboro, N.Y.:

"FIL2": calcium carbonate, obtained under the trade designation "Q325" from J.M. Huber Corporation, Atlanta, Ga.;

"FIL3": Peerless clay, obtained under the trade designation "PEERLESS #4 KAOLIN CLAY" from RT Vanderbilt Company, Bath, S.C.;

"GC1": a greige cloth consisting of 100% cotton X weight drills, obtained from Companhia Jauense Industrial, Sao Paulo, Brazil;

"GC2": a greige cloth consisting of a 100% polyester sateen fabric from open-end spun yarns weighing 150 grams per square meter (g/m$^2$), commercially available under trade designation "POWERSTRAIGHT" from Milliken and Co., Spartanburg, S.C.;

"GC3": a greige cloth consisting of a 100% polyester sateen fabric from open-end spun yarns weighing 326 g/m$^2$, commercially available under trade designation "POWERSTRAIGHT" from Milliken and Co.;

"GC4": a dyed and stretched greige cloth consisting of 100% cotton drills from open-end spun yarns weighing 224 g/m$^2$, commercially available from Milliken and Co.;

"LA1": a polyamide hot melt laminating adhesive, obtained under the trade designation "JET MELT BRAND ADHESIVE PG3779" from 3M Company;

"LA2": a laminating adhesive prepared as follows: a 237 ml glass jar was charged with 100 g of EP1, 28 g of ADHCUR1, 5 g of ADHCUR2 and 80 g of FIL1, and then mixed with low shear mixer until homogenous;

"LT1": a latex material, obtained under the trade designation "HYCAR 1581" from Noveon, Inc., Cleveland, Ohio;

"MIN1": ANSI grade 50 aluminum oxide/zirconium oxide eutectic blend, obtained under the trade designation "NORZON" from Saint-Gobain Abrasives, Worcester, Mass.;

"MIN2": ANSI grade 60 abrasive mineral, obtained under the trade designation "DURALUM G52 BROWN ALUMINUM OXIDE GRADE 60" from Washington Mills Electro Minerals Corporation, Niagara Falls, N.Y.;

"MIN3": ANSI grade 80 abrasive mineral, obtained under the trade designation "DURALUM G52 BROWN ALUMINUM OXIDE GRADE 80" from Washington Mills Electro Minerals Corporation;

"MIN4": ANSI grade 60 abrasive mineral, obtained under the trade designation "3M CUBITRON ABRASIVE GRAIN 321" from 3M Company;

"MIN5": JIS grade 400 abrasive mineral, obtained under the trade designation "3M CUBITRON ABRASIVE GRAIN 321" from 3M Company;

"MIN6": ANSI grade 80 abrasive mineral, obtained under the trade designation "3M CUBITRON ABRASIVE GRAIN 321" from 3M Company;

"OX 50": amorphous silica, obtained under the trade designation "AEROSIL OX 50" from Degussa Corporation, Vernon, Ill.;

"NOV1": novolac resin, obtained under the trade designation "RUTAPHEN 8656F" from Bakelite AG, Frielendorf, Germany;

"PI1": 2,2-dimethoxy-2-phenylacetophenone, obtained under trade designation "IRGACURE 651" from Ciba Specialty Chemicals, Hawthorne, N.Y.;

"PI2": 2-benzyl-2-(dimethylamino)-1-[4-(4-morpholinyl) phenyl]-1-butanone obtained under the trade designation "IRGACURE 369" from Ciba Specialty Chemicals.

The following test method was used throughout the Examples.

Stripback Adhesion Test

A wooden board with dimensions 17.8 cm×7.6 cm×6 mm was coated with laminating compositions LA1 or LA2 as follows.

If LA1 was used, it was dispensed using a hot melt adhesive glue gun. A 15 cm section of a 25 cm×8 cm strip of the coated abrasive to be tested was partially overlaid onto the molten laminating adhesive with the abrasive side facing the laminating adhesive. The abrasive strip was then pressed into position and then the assembly was cooled to 25° C.

If LA2 was used, a 15 cm section of a 25 cm×8 cm strip of the coated abrasive to be tested, with abrasive side also coated with laminating adhesive (in addition to the board), was partially overlaid onto the laminating adhesive with the abrasive side facing the board. The abrasive strip was then pressed into position, and cure at 25° C. for 12 hours and finally at 50° C. for 4 hours.

The wooden board was mounted horizontally into the upper jaws of a tensile testing machine, obtained under the trade designation "SINTECH 6W" from MTS Systems Corporation, Eden Prairie, Minn. The free end of the coated abrasive was then attached to the lower jaws of the tensile tester and, at a rate of 0.5 mm/second, the lower jaws pulled the coated abrasive from the wooden board at an angle of 90 degrees. The force, expressed in Newtons per centimeter (N/cm) of specimen width, necessary to cause failure of the test specimen was reported. The test was run in triplicate.

Resin Preparation

Abrasive Slurry 1 (AS1)

An abrasive slurry was prepared by adding the following components, in the order listed, to a 5 gallon (18 liter) pail: 9583 g of ACR, 86 96 g of PI2, 8688 g of FIL1, 372 g of CPA1, 87 g of OX 50, 11172 g of MIN5. The slurry was mixed for one hour at 1250 rpm using a high shear mixer (model PHR-2A) available from Scott Turbon Mixer, Inc., Adelanto, Calif. until the slurry temperature reached 80° F. (26.7° C.).

Abrasive Slurry 2 (AS2)

An abrasive slurry was prepared by adding the following components, in the order listed, to a 5 gallon (18 liter) pail: 5932 g of ACR4, 60 g of PI2, 5817 g of FIL1, 290 g of CPA1, 290 g of OX 50, and 12610 g of MIN6. The slurry was mixed for one hour at 1250 rpm using a high shear mixer (model PHR-2A) available from Scott Turbon Mixer, Inc., until the slurry temperature reached 80° F. (26.7° C.).

Backsize Resin 1 (BSR1)

BSR1 was prepared by mechanically stirring until homogeneous, at 20° C., 420 g of FIL2, 15 g of RIO and 180 g of LT1 into 120 g of a phenol-formaldehyde resin having a phenol to formaldehyde ratio of 1.5-2.1/1, catalyzed with 2.5 percent by weight sodium hydroxide. The mixture was then diluted to one kilogram with water.

Backsize Resin 2 (BSR2)

BSR2 was prepared by mechanically stirring until homogeneous, at 20° C., 450 g of FIL2 and 15 g of RIO into 285 g of a phenol-formaldehyde resin having a phenol to formaldehyde ratio of 1.5-2.1/1, catalyzed with 2.5 percent by weight sodium hydroxide. The mixture was then diluted to one kilogram with water.

Backsize Resin 3 (BSR3)

BSR3 was prepared by mechanically stirring until homogeneous, at 20° C., 90 g of FIL3, and 250 g of LT1 into 250 g of a phenol-formaldehyde resin having a phenol to formaldehyde ratio of 2.1/1, catalyzed with 2.5 percent by weight sodium hydroxide. The mixture was then diluted to one kilogram with water.

Cloth Saturating Resin 1 (CSR1)

CSR1 was prepared by mechanically stirring until homogeneous, at 20° C., 100 g of LT1 into 120 g of a phenol-formaldehyde resin having a phenol to formaldehyde ratio of 1.5-2.1/1, catalyzed with 2.5 percent by weight sodium hydroxide. The mixture was then diluted to one kilogram with water.

Cloth Treating Resin 1 (CTR1)

EP1 (110.0 g) and 2.0 g of PI1 were added to an 8-ounce (236.6 milliliters) glass jar and manually mixed at 20° C. until homogeneous. The jar was then placed in an oven set at 60° C. for 30 minutes. The jar was removed from the oven and the following compounds added and manually mixed until homogeneous: 10.0 g of NOV1, 60.0 g of ACR1, 15.0 g of ACR3, and 16.0 g of DICY. Just prior to coating, 1.5 g of CUR1 was added and manually mixed until homogeneous.

Cloth Treating Resin 2 (CTR2)

CTR2 was prepared according to the method described in CTR1, except for the following changes in composition: 22.5 g of EP1, 1.0 g of PI1, 1.5 g of NOV1, 70.0 g of ACR1, 3.0 g of ACR3, 1.5 g of DICY, and 0.3 g of CUR1.

Cloth Treating Resin 3 (CTR3)

CTR3 was prepared according to the method described in CTR 1, except for the following changes in composition: 110.0 g of EP1, 2.0 g of PI1, 10.0 g of NOV1, 60.0 g of ACR1, 16.0 g of DICY, and 1.5 g of CUR1.

Cloth Treating Resin 4 (CTR4)

CTR4 was prepared according to the method described in CTR1, except for the following changes in composition: 110.0 g of EP1, 2.0 g of PI1, 10.0 g of NOV1, 60.0 g of ACR2, 16.0 g of DICY, and 1.5 g of CUR1.

Cloth Treating Resin 5 (CTR5)

CTR5 was prepared according to the method described in CTR1, except for the following changes in composition: 140.0 g of EP1, 2.0 g of PI1, 10.0 g of NOV1, 30 g of ACR1, 16.0 g of DICY, and 1.5 g of CUR1.

Cloth Treating Resin 6 (CTR6)

CTR6 was prepared according to the method described in CTR1, except for the following changes in composition: 140.0 g of EP1, 2.0 g of PI1, 10.0 g of NOV1, 30 g of ACR1, 10 g of ACR3, 16.0 g of DICY, and 1.5 g of CUR1.

Cloth Treating Resin 7 (CTR7)

CTR7 was prepared by mechanically mixing at 20° C., 11306 g EP1 and 151 g PI1 in a 5-gallon (19-liter) pail. The pail was then placed in an oven for 30 minutes at 70° C. The pail was removed from the oven and 754 g of NOV1 and 1206 g of DICY to added to the pail and mixed until homogeneous. Finally, 114 g of CUR1 was mixed into the composition just prior to coating the resin.

Make Resin 1 (MR1)

MR1 was prepared by mechanically stirring until homogeneous, at 20° C., 425 g FIL2 into 425 g of a phenol-formaldehyde resin having a phenol to formaldehyde ratio of 1.5-2.1/1, catalyzed with 2.5 percent by weight sodium hydroxide. The mixture was then diluted with water to one kilogram total weight.

Make Resin 2 (MR2)

MR2 was prepared by mechanically stirring until homogeneous, at 20° C., 415 g FIL2 into 415 g of a phenol-formaldehyde resin having a phenol to formaldehyde ratio of 1.5-2. 1/1, catalyzed with 2.5 percent by weight sodium hydroxide. The mixture was then diluted with water to one kilogram total weight.

Tie Coat Resin (TCR)

TCR was prepared by mechanically mixing at 20° C., 13650 g of ACR1 and 150 g of PI1 in a 5-gallon (18-liter) pail. The pail was then placed in an oven for 4 hours at 60° C. The pail was removed from the oven and 150 g AFR1 and 750 g AZ1 to added to the pail and mixed until homogeneous prior to coating.

Size Resin 1 (SR1)

SR1 was prepared by mechanically stirring until homogeneous, at 20° C., 544 g FIL2 into 256 g of a phenol-formaldehyde resin having a phenol to formaldehyde ratio of 1.5-2.1/1 and catalyzed with 2.5 percent by weight sodium hydroxide. The mixture was diluted with water to one kilogram total weight.

Backing Treatment

Treated Cloth 1 (TC1)

Cloth Treating Resin CTR3 was applied to the front side of a 6-inch×12-inch (15.2×30.4 cm) greige cloth GC1 using a 4-inch (10.2 cm) wide hand-held coating knife, available from the Paul N. Gardner Company, Pompano Beach, Fla. The knife gap was set to a gap of 3-mil (76.2 micrometers). The treated cloth was then irradiated with an ultraviolet (UV) lamp, type "D" bulb, from Fusion Systems Inc., Gaithersburg, Md., at 7.6 meters per minute (mpm) and 118 Watts/cm$^2$ (118 J/cm$^2$-sec), then thermally cured by heating at 160° C. for 10 minutes. Backsize resin BSR1 was then applied on the opposite side of the cloth using the same coating procedure as for the front side, after which the resin was thermally cured in sequential 10 minute intervals at 90° C., 110° C. and 120° C.

Treated Cloths 2-6 (TC2-TC6, Respectively)

These examples were made according to the same method described in the preparation of TC1, except that the compositions were modified as listed in Table 1.

Treated Cloth 7 (TC7)

Cloth Treating Resin CTR2 was applied to the front side of a 12 inch (30 cm) wide web greige cloth GC3 using a floating coating knife. The wet add on weight was 113 g/m$^2$. The treated cloth was then irradiated with an ultraviolet (UV) lamp, type "D" bulb, from Fusion Systems Inc., at 7.6 m/min and 118 Watts/cm$^2$ (118 J/cm$^2$-sec), and then thermally cured by heating in a tunnel oven at 170° C. for 1 minute and then at 160° C. for 2 minutes. Tie Coat Resin TCR was applied over the cured CTR2 coating using the same coating and irradiating procedures as for the front side, then thermally cured by heating in a tunnel oven at 120° C. for 3 minutes. Backsize resin BSR2 was then roll coated on the opposite side of the cloth (back side) at wet add on weight of 125 g/m$^2$, after which the resin was thermally cured in sequential 3-minute intervals at 90° C., 110° C. and 120° C.

Treated Cloth 8 (TC8)

Treated Cloth 8 was prepared according to method used in the preparation of TC7, except that the sequence of cloth treating steps was BSR2 applied first, followed by CTR2 and finally TCR was applied last (BSR2 back side, CTR2 front side, then TCR on front side).

Comparative Treated Cloths A-C (CTCA-CTCC, respectively)

Comparative Treated Cloths A-C were made according to the preparation of TC1, except that the compositions were modified as listed in Table 1.

Comparative Treated Cloth D (CTCD)

Comparative Treated Cloth D was prepared by saturating GC4 with 85 g/m$^2$ BSR3 and then thermally cured in sequential one-minute intervals at 90° C., 110° C. and 120° C. The saturated cloth was then backsized with 25 g/m$^2$ BSR3 as in the preparation of TC1 and thermally cured in sequential 3-minute intervals at 90° C., 110° C. and 120° C.

Comparative Treated Cloth E (CTCE)

Comparative Treated Cloth E was made according to the preparation of TC7, with the exception that CTR2 was replaced with CTR7.

Comparative Treated Cloth F (CTCF)

Comparative Treated Cloth F was prepared by saturating GC3 with about 100 g/m$^2$ CSR1 and was subsequently backsized with a target weight of 100 g/m$^2$ BSR1 as in the preparation of TC1. The backing was then pre-sized with LT1 at a wet add on weight of 25 g/m$^2$. Finally, the backing was tie coated with a target weight of 19 g/m$^2$ ACR4.

TABLE 1

| TREATED CLOTH | CLOTH TREATING RESIN | TIE COAT RESIN | BACKSIZE RESIN | GREIGE CLOTH TYPE |
|---|---|---|---|---|
| TC1 | CTR3 | None | BSR1 | GC1 |
| TC2 | CTR4 | None | BSR2 | GC1 |
| TC3 | CTR1 | None | BSR2 | GC1 |
| TC4 | CTR3 | None | BSR2 | GC2 |
| TC5 | CTR1 | None | BSR2 | GC2 |
| TC6 | CTR3 | None | BSR3 | GC4 |
| TC7 | CTR2 | TCR | BSR2 | GC3 |
| TC8 | CTR2 | TCR | BSR2 | GC3 |
| CTCA | CTR5 | None | BSR1 | GC1 |
| CTCB | CTR6 | None | BSR2 | GC1 |
| CTCC | CTR6 | None | BSR2 | GC2 |
| CTCD | BSR3 | None | BSR3 | GC4 |
| CTCE | CTR7 | TCR | BSR2 | GC2 |
| CTCF | CSR1 | LT1 | BSR1 | GC3 |

Coated Abrasive Articles

Coated Abrasive 1 (CA1)

Coated Abrasive 1 was prepared by coating Make Resin MR1 onto the front side of the TC1 using a 3-inch (7.6-cm) wide hand-held coating knife available from the Paul N. Gardner Company. The knife gap was set to a gap of 3-mil (76.2 micrometers). MIN1 was dropped coated into the make resin to form a closed coat at a coating weight of about 620 g/m$^2$. The coated abrasive was then thermally cured in an oven set at 90° C. for 60 minutes, followed by 10 hours set at 105° C.

Coated Abrasive 2 (CA2)

Coated Abrasive 2 was prepared according to the preparation of CA1, except that TC1 was replaced with TC2.

Coated Abrasive 3 (CA3)

Coated Abrasive 3 was prepared according to the preparation of CA2, except that TC2 was replaced with TC3.

Coated Abrasive 4 (CA4)

Coated Abrasive 4 was prepared according to the preparation of CA3, except that TC3 was replaced with TC4.

Coated Abrasive 5 (CA5)

Coated Abrasive 5 was prepared according to the preparation of CA4, except that TC4 was replaced with TC5.

Coated Abrasive 6 (CA6)

Coated Abrasive 6 was prepared by coating Make Resin MR2 onto the front side of the TC6 using a 3" (7.62 cm) hand-held coating knife. The knife gap was set to a gap of 1-mil (25.4 micrometers). MIN2 was dropped coated into the make resin to form a mineral coating weight of about 160 g/m$^2$. MIN4 was then electrostatically coated to obtain a mineral coating weight of about 290 g/m$^2$. The coated abrasive was then thermally cured in an oven set at 90° C. for 60 minutes, followed by 10 hours set at 105° C. A 3-inch (7.6-cm) paint roller was used to apply 290 g/m$^2$ of Size Resin SR1. The size resin was subsequently cured in an oven set at 90° C. for 1 hour, followed by 12 hours set 102° C.

Coated Abrasive 7 (CA7)

Coated Abrasive 7 was prepared accord to the preparation of CA6, except that MIN2 was replaced with an equal coating weight of MIN3, and MIN4 was replaced with MIN6 at a mineral coating weight of about 230 g/m$^2$.

Comparative Coated Abrasive G (CCAG)

Comparative Coated Abrasive G was prepared according to the preparation of CA1, except that TC1 was replaced with CTCA.

Comparative Coated Abrasive H (CCAH)

Comparative Coated Abrasive H was prepared according to the method described in CCAG, except that CTCA was replaced with CTCB.

Comparative Coated Abrasive I (CCAI)

Comparative Coated Abrasive I was prepared according to the method described in Comparative Example H, except that CTCB was replaced with CTCC.

Comparative Coated Abrasive J (CCAJ)

Comparative Coated Abrasive J was prepared according to the preparation of CA6, except that TC6 was replaced with CTCD.

Comparative Coated Abrasive K (CCAK)

Comparative Example K was prepared according to the preparation of CA7, except that TC6 was replaced with CTCD.

Stripback Adhesion tests were performed on the coated abrasives according to the method described above, using Laminating Adhesive LA2. Results are reported in Table 2 (below).

TABLE 2

| COATED ABRASIVE | TREATED CLOTH | MAKE RESIN | MINERAL | STRIPBACK ADHESION, lbs/inch, (N/cm) |
|---|---|---|---|---|
| CA1 | TC1 | MR1 | MIN1 | 25.6 (2.89) |
| CA2 | TC2 | MR1 | MIN1 | 17.9 (2.02) |
| CA3 | TC3 | MR1 | MIN1 | 24.2 (2.73) |
| CA4 | TC4 | MR1 | MIN1 | 19.2 (2.17) |
| CA5 | TC5 | MR1 | MIN1 | 18.0 (2.03) |
| CA6 | TC6 | MR2 | MIN2/MIN4 | 16.9 (1.91) |
| CA7 | TC6 | MR2 | MIN3/MIN6 | 16.3 (1.84) |
| CCAG | CTCA | MR1 | MIN1 | 23.3 (2.63) |
| CCAH | CTCB | MR1 | MIN1 | 21.5 (2.43) |
| CCAI | CTCC | MR1 | MIN1 | 18.0 (2.03) |
| CCAJ | CTCD | MR2 | MIN2/MIN4 | 14.1 (1.59) |
| CCAK | CTCD | MR2 | MIN3/MIN6 | 14.2 (1.60) |

Coated Abrasive 8 (CA8)

Coated Abrasive 8 was prepared according to the method described in paragraphs 0083 and 0084 of published U.S. Publ. Pat. Appln. No. US 2005/0060947A1 (McArdle et al.), the disclosure of which is incorporated herein by reference.

A transparent polypropylene tool was used. The tool had a plurality of precisely-shaped, square-based pyramidal-type cavities 65 mils (1.65 millimeter) square by 30 mils (0.76 millimeter) deep, and the pyramidal-type cavities were placed such that their bases were butted up against one another. Abrasive Slurry AS1 was knife coated onto backing TC7 at a coating thickness of 25 mils (0.64 millimeter) and a coating width of approximately 9 inches (23 cm). The slurry-coated backing was brought into contact with the cavities of the transparent polypropylene tool under a nip roll pressure of 60 lb/in$^2$ pounds(414 kPa), and the slurry was then irradiated with light from two lamps ("D" bulbs, commercially available from Fusion Corp.) operating at 600 Watts/in$^2$ (118J/cm$^2$-sec). The coating process operated at approximately 50 feet/minute (15 meters/minute.) After the abrasive was removed from the coating apparatus, the abrasive was heated in an oven at 240° F. (115° C.) for 24 hours.

Coated Abrasive 9 (CA9)

Coated Abrasive 9 was prepared according to the procedure for making CA8, except that AS1 was replaced with AS2, the slurry knife-coating thickness was 32 mils (0.81 millimeter) and the nip roll pressure was 90 lb/in$^2$ (620 kPa).

Coated Abrasive 10 (CA10)

Coated Abrasive 10 was prepared according to the procedure for making CA8, except that TC7 was replaced with TC8.

Coated Abrasive 11 (CA11)

Coated Abrasive 11 was prepared according to the procedure for making CA9, except that TC7 was replaced with TC8.

Comparative Coated Abrasive L (CCAL)

Comparative Coated Abrasive L was prepared according to the procedure of CA8, except that TC7 was replaced with CTCE.

Comparative Coated Abrasive M (CCAM)

Comparative Coated Abrasive M was prepared according to the procedure of CA9, except that TC7 was replaced with CTCE.

Comparative Coated Abrasive N (CCAN)

Comparative Coated Abrasive N was prepared according to the procedure of CCAL, except that CTCE was replaced with CTCF.

Comparative Coated Abrasive (CCAO)

Comparative Coated Abrasive O was prepared according to the procedure of CCAM, except that CTCE was replaced with CTCF.

Stripback Adhesion tests were performed on the precisely-shaped abrasive articles according to the method described above. Results are reported in Table 3 (below).

TABLE 3

| COATED ABRASIVE | ABRASIVE SLURRY | TREATED CLOTH | STRIPBACK LAMINATING ADHESIVE | AVERAGE STRIPBACK, lb/inch, (N/cm) |
|---|---|---|---|---|
| CA8 | AS1 | TC7 | LA2 | 37.5 (4.23) |
| CA9 | AS2 | TC7 | LA2 | 20 (2.26) |
| CA10 | AS1 | TC8 | LA2 | 36.4 (4.11) |
| CA11 | AS2 | TC8 | LA2 | 30.4 (3.43) |
| CCAL | AS1 | CTCE | LA1 | 7.6 (0.86) |
| CCAM | AS2 | CTCE | LA1 | 3.6 (0.41) |
| CCAN | AS1 | CTCF | LA2 | 20.1 (2.27) |
| CCAO | AS2 | CTCF | LA2 | 14.1 (1.59) |

Various modifications and alterations of this invention may be made by those skilled in the art without departing from the scope and spirit of this invention, and it should be understood that this invention is not to be unduly limited to the illustrative embodiments set forth herein.

What is claimed is:

1. A coated abrasive article comprising a backing and an abrasive layer, further comprising at least one of a presize layer, a saturant, a subsize, a backsize layer, or a tie layer that comprising a binder that, based on the total weight of components a) through f), is a reaction product of components comprising:
   a) from 20 to 65 percent by weight of epoxy resin preparable by reaction of epichlorohydrin with at least one of bisphenol A or bisphenol F;
   b) from 29 to 75 percent by weight of polyfunctional urethane(meth)acrylate;

c) from 0.1 to 15 percent by weight of novolac resin;
d) dicyandiamide;
e) photoinitiator; and
f) optional epoxy cure catalyst.

2. A coated abrasive article according to claim 1, wherein the binder is essentially free of dissolved thermoplastic polymer.

3. A coated abrasive article according to claim 1, wherein the abrasive layer comprises make and size layers and abrasive particles.

4. A coated abrasive article according to claim 3, wherein the backing comprises fabric that has a basis weight in a range of from 200 to 270 grams per square meter.

5. A coated abrasive article according to claim 3, further comprising a supersize layer.

6. A coated abrasive article according to claim 1, wherein the abrasive layer comprises abrasive particles dispersed in a binder.

7. A coated abrasive article according to claim 6, wherein the abrasive layer comprises abrasive composites.

8. A coated abrasive article according to claim 6, wherein the abrasive layer comprises precisely-shaped abrasive composites.

9. A method of abrading a workpiece comprising:
providing a coated abrasive article according to claim 1;
frictionally contacting at least a portion of the abrasive layer with at least a portion of a surface of the workpiece; and
moving at least one of the coated abrasive article or the workpiece relative to the other to abrade at least a portion of the surface.

10. A method of making a coated abrasive article comprising:
disposing a backing treatment precursor on at least a portion of a backing, the backing treatment precursor comprising, based on the total weight of components a) to f):
a) from 20 to 65 percent by weight of epoxy resin preparable by reaction of epichlorohydrin with at least one of bisphenol A or bisphenol F;
b) from 29 to 75 percent by weight of polyfunctional urethane(meth)acrylate;
c) from 0.1 to 15 percent by weight of novolac resin;
d) dicyandiamide;
e) photoinitiator; and
f) optional epoxy cure catalyst;
at least partially polymerizing the backing treatment precursor;
disposing a slurry comprising polymerizable binder precursor and abrasive particles on the at least partially polymerized backing treatment precursor; and
at least partially polymerizing the binder precursor.

11. A method according to claim 10, wherein the backing is a treated backing having at least one treatment secured thereto selected from the group consisting of a presize, a backsize, a sub-size, and a saturant.

12. A method according to claim 10, further comprising providing a tool having a surface with a plurality of precisely-shaped cavities therein, and urging the slurry into at least a portion of the cavities.

* * * * *